United States Patent [19]

Palmer

[11] Patent Number: 4,712,270
[45] Date of Patent: Dec. 15, 1987

[54] BRAKE DRUM ENCAPSULATOR
[75] Inventor: Gary E. Palmer, Roselle, Ill.
[73] Assignee: Hako Minuteman, Inc., Addison, Ill.
[21] Appl. No.: 9,837
[22] Filed: Feb. 2, 1987
[51] Int. Cl.$^4$ .............................................. A47L 5/14
[52] U.S. Cl. ........................................ 15/345; 15/339
[58] Field of Search .......................... 15/345, 346, 339

[56] References Cited
U.S. PATENT DOCUMENTS 3,222,707 12/1965 Allenbaugh ........................... 15/345
4,205,412  6/1980 Weber .................................... 15/345

FOREIGN PATENT DOCUMENTS 2643067  3/1978 Fed. Rep. of Germany ........ 15/345
2917663 12/1980 Fed. Rep. of Germany ........ 15/345
2936778  4/1981 Fed. Rep. of Germany ........ 15/345
2936779  4/1981 Fed. Rep. of Germany ........ 15/345
2346061 10/1977 France ................................... 15/345

OTHER PUBLICATIONS

Minuteman "BrakeClean" I—photograph.
Minuteman "BrakeClean" II—photograph.
Brochure—Elektroma WS42 and WS42GGS.
Brochure—NILFISK (1) "Absolute-Filtered" Vacuum Cleaners.
Brochure—NILFISK (2) "Nilfisk Simplifies the Safe Collection ...".

Primary Examiner—Chris K. Moore
Attorney, Agent, or Firm—Emrich & Dithmar

[57] ABSTRACT

A brake drum encapsulator includes a wire frame in a generally cylindrical shape with a cover surrounding the frame and having a closed end and an open end. The brake drum assembly is received in the open end of the cover which is then closed about the brake drum and evacuated. The cover is made of a material which is light weight, flexible, transparent and gas impermeable to give the operator full visibility to the interior. The cover has a pair of gloves integrally formed in it to permit the operator to have access to the interior. A hand-operated air gun for cleaning the brake drums is also attached to the closed end of the cover. The closed end of the cover preferably has a frustoconical portion which allows the operator to move his hands and the air gun back and forth as well as laterally within the encapsulator for servicing the brake drum.

7 Claims, 3 Drawing Figures

BRAKE DRUM ENCAPSULATOR

FIELD OF THE INVENTION

The present invention relates to apparatus for enclosing brake drum assemblies while they are being cleaned or repaired. This type of apparatus is normally used during the course of cleaning or relining the brakes on automobiles or trucks, and it is common to clean the brake drum by means of forced air. However, since brake linings employ asbestos-based material, it is undesirable to permit the dust created from air-cleaning brake drums to enter the atmosphere. Therefore, various types of apparatus have been used for encapsulating the brake drums during the forced-air cleaning of the drums.

BACKGROUND AND SUMMARY OF THE INVENTION

One commercially available type of brake drum cleaning apparatus includes a metal canister or hood which is mounted on a movable base and adapted to surround the brake drum. The back of the canister is provided with a flexible closure member which is drawn about the back of the brake drum; and the solid canister includes, in its side wall, a window for viewing the operation, and an opening in the side wall (or the end wall) equipped with a piece of material in the form of a sack which serves as a hand and arm protector permitting the operator to have hand access to the interior of the canister for removing the brake linings or directing forced air to clean the brake drum. In this embodiment, air is brought to the interior of the canister by means of quick disconnect fittings rigidly attached to the end wall of the canister; and the canister is evacuated continuously by means of a vacuum cleaner equipped with a HEPA (high efficiency particulate air) filter.

Another embodiment has a wire cage with a clear plastic cover equipped with a series of access apertures in the form of small circular reinforced ribs with slits in the form of "x's" to form valves which allow an air nozzle or tube to be inserted for clearing the drums with the hard valve on the outside of the enclosure and free to be moved to another access aperture. These devices do not permit the operator to have protected hand access to the brake drums for removal. It is also believed to be undesirable to have the air nozzle free to be operated outside the encapsulator because of the possibility of creating dust with entrained asbestos particles due to the hazard involved.

The present invention provide improvements over existing commercial apparatus for cleaning brake drum assemblies by providing a system which is lower in cost, lighter in weight (and, therefore, more maneuverable), and which facilitates access to the interior of the enclosure and enhances the maneuverability and field of view of the operator within the enclosure. The encapsulator of the present invention includes a cage in the form of a ribbed drum made of welded metal rod which is light in weight and provides full visibility to the interior. A cover of clear, continuous vinyl material encapsulates the cage, fully sealing the cylindrical wall of the cage as well as the distal end (i.e., the end remote from the brake assembly). The proximal end of the vinyl cover is provided with a bungee cord or draw string and defines an opening for receiving a brake drum assembly. After the brake drum assembly is positioned within the encapsulator, the bungee cord is pulled tight about the rear of the drum assembly.

A pair of gloves are integrally formed in the closed end of the cover, permitting the operator to extend both hands into the interior of the enclosure to disassemble the brake drum or remove the brake lining. The closed end of the vinyl cover is a wall of generally frustoconical shape which permits the operator to move his hands back and forth as well as laterally in the encapsulator. The central-most portion of the movable end wall of the cover is flat and has an air gun assembled to it, with a hand-actuated valve on the outside, and a discharge nozzle on the inside so that the air valve cannot be removed and inadvertently discharged into the atmosphere. A conventional vacuum cleaner with an HEPA filter is used to evacuate the enclosure.

Other features and advantages of the present invention will be apparent to persons skilled in the art from the following detailed description of a preferred embodiment accompanied by the attached drawing wherein identical reference numerals will refer to like parts in the various views.

DESCRIPTION OF THE PREFERRED EMBODIMENT

Figure 1:
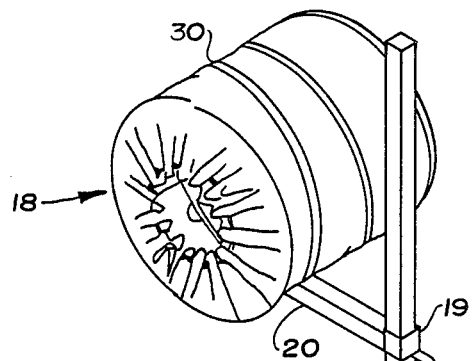
FIG. 1 is a upper perspective view taken from the rear of the improved brake drum cleaning apparatus incorporating the present invention.

Referring, then, to FIG. 1, reference numeral 10 generally designates a movable stand or dolly including a base or carriage formed of first and second side tubes 11, 12 and a cross tube 13 welded to form the base. Casters 15 are provided on the side tubes 11, 12 to permit the dolly to be moved. An upright member or standard 16 is mounted to the top of the base and extends vertically to provide a support for an encapsulator assembly or enclosure generally designated by reference numeral 18. Toward that end, a square sleeve 19 is slidably received on the standard 16; and a laterally-extending support arm 20 is welded to the sleeve 19 (see FIGS. 1 and 2).

A threaded nut 22 is welded to the side of the sleeve 19 opposite the arm 20; and an externally threaded jam handle 23 is received in the nut 22. When the handle 23 is loosened, the height of the arm 20 may be adjusted along the standard 16; and when the handle 23 is tightened in the nut 22, it engages the side of the standard 16 and it locks the arm 20 at a desired elevation.

Figure 2:
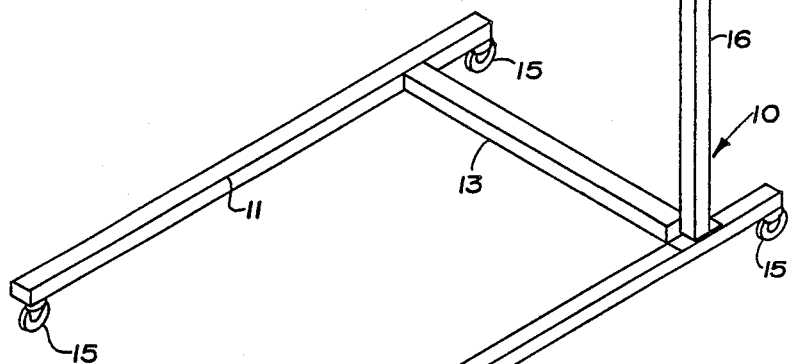
FIG. 2 is an upper side perspective view of a portion of the movable base and adjustable support shown in FIG. 1.

A bracket 25 in the form of a cradle is mounted to the end of the adjustable arm 20, as best seen in FIG. 2. The bracket 25 has two generally curved portions 26 and 27 which are adapted to receive and support the encapsulator assembly 18 and to hold it in place. The curved portion 28 of bracket 25 is provided with an aperture 29 for receiving the connection to the vacuum hose, to be described.

A tension cord or shock cord 30 having two hooked ends, one of which is seen at 31 in FIG. 2, is provided to hold the encapsulator assembly 18 in place on the arm 20 by fixing the hooks 31 in apertures 33 on the bracket 25.

Figure 3:
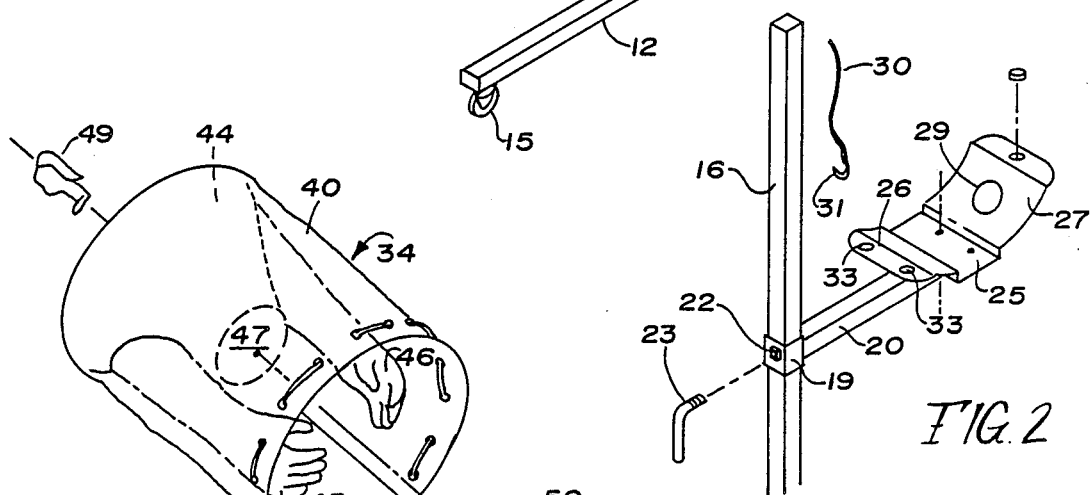
FIG. 3 is an exploded view, in perspective, of the wire cage, vinyl enclosure and air nozzle for the apparatus of FIG. 1.

Turning now to FIG. 3, the encapsulator assembly 18 includes an internal frame in the form of a ribbed cage generally designated 33 and a clear vinyl cover 34. The frame 33 has a generally cylindrical form with a first end ring 35 defining an open proximate end for receiving a brake drum assembly, and a second end ring 36 defining a distal end. The rings 35, 36 are held togther by rods 37 spaced in a cylinder about the circumference of the frame and parallel to its axis. An exhaust port is formed by means of a vacuum connection conduit 38 which is secured to two adjacent ones of the rods 37 and which passes through the previously described aperture 29 of bracket 25.

The cover 34 may be made entirely of clear plastic such as polyvinylchloride (or simply "vinyl" for short). It includes a generally cylindrical side wall portion 40 which is longer than the axial length of the frame 33 so that the proximal or open end portion will fit over the ring 35 and may be drawn closed about a brake drum assembly inside the frame 33 by means of draw or bungee cord 41. The ends of the draw cord 41 are provided with hooks 42 which are adapted to be coupled to some portion of the automobile or vehicle being worked on so that the enclosure cannot inadvertently be removed from the brake drum assembly once it is received within the enclosure and sealed.

The distal or closed end of the cover 34 includes a movable end wall 44 having a generally frustoconical shape and provided with first and second gloves 45, 46 extending out of the conical side wall of the baffle 44 and located entirely within the encapsulator. The innermost portion of the end wall 44 may be flat as indicated at 47, and a two-piece air handle including a hand-actuated valve and handle portion 49 and a discharge nozzle 50 are assembled together while holding the flat center portion 47 of the end wall 44. In particular, the nozzle 50 is threaded into the discharge end of the handle 49 so that the air applicator comprising the handle 49 and nozzle 50 cannot be removed from the drum enclosure. The handle 49 may be provided with a quick disconnect for receiving an air hose coupled to a compressor or other source of pressurized air. Similarly, as will be apparent, the vacuum conduit 38 may pass through the cover 34 (while being sealed to it) for attachment to a flexible hose which, in turn, is connected to the inlet port of a vacuum cleaner equipped with a HEPA filter.

In operation, the dolly 10 may be rolled over to the brake drum needing repair, and the arm 20 adjusted in height on the standard 16 by means of the jamb handle 23. With the enclosure 18 properly aligned with the drum assembly, the dolly 10 is then moved closer toward the vehicle so that the brake drum assembly is received within the frame 33 and cover 34. The draw cord 41 is then tightly secured about the drum assembly. It is not required that an air-tight seal be formed because when the vacuum cleaner is turned on, it is desirable that some air be drawn in about the back of the drum assembly. This has two functions. First, it draws in any dust or debris that may have been dislodged behind the brake drum assembly, and secondly, it insures a continuous flow of air about the periphery of the drum assembly to entrain and carry off any debris or dust when the drum assembly is cleaned by means of the air nozzle.

The operator has access to the fully-enclosed brake drum assembly with both hands by means of the gloves 45, 46; and the air handle 49 and nozzle 50 are always located in a known place for easy access. The end wall 44 not only supports the air handle, but also, due to its conical shape, permits the operator to move the air handle toward the drum itself as well as about the brake drum being cleaned.

One of the significant adavantages of the encapsulator described above is that the operator has full 360° vision of the brake drum assembly without having to maneuver the encapsulator in any way; and he may see the item on which he is working from wherever he is located. Further, there is assurance that the air nozzle will not be discharged into the atmosphere and stir up asbestos dust.

Having thus disclosed in detail a preferred embodiment of the invention, persons skilled in the art will be able to modify certain of the structure which has been illustrated and to substitute equivlent elements for those disclosed while continuing to practice the principle of the invention. It is, therefore, intended that all such modifications and substitutions be covered as they are embraced within the spirit and scope of the appended claims.

I claim:

1. Apparatus for encapsulating brake drums comprising: a support stand; a frame having a generally open side wall and substantially open first and second ends; means for mounting said frame to said stand; a flexible cover having at least a continuous side wall of transparent, flexible, gas impermeable material, an open end for receiving said frame, and a continuous closed end wall of flexible material; means for drawing the open end of said cover about a brake assembly received in said cover and frame for substantially sealing said open end, said frame and cover being adapted to be coupled to means for evacuating the interior of said cover; the closed end wall of said cover having material of an area greater than the planar area thereof to permit back and forth as well as lateral motion within said apparatus; and means defining at least one glove integral with the closed end wall of said cover and adapted to receive at least one hand of an operator inside said cage for manipulating said drum assembly while permitting full vision of said drum assembly through said side wall.

2. The apparatus of claim 1 wherein said cover is of a plastic vinyl material having a generally cylindrical side wall portion with said open end adapted to receive said frame and said closed end wall thereof having a generally conical wall portion the base of which is continuous with the side wall of said cover; and means defining a second glove integral with said conical side wall and extending to the interior of said cover to complement said first glove.

3. The apparatus of claim 2 wherein the conical wall portion of said end wall of said cover defines a central section; said apparatus further comprising a hand-operated air gun attached to the central section of said end wall of said cover.

4. The apparatus of claim 3 wherein said air gun comprises a hand-actuated valve adapted to be connected to a source of pressurized air on the outside of said end wall; and a nozzle connected to the output end of said hand-operated valve and located on the inside of said cover and received through the innermost section of said end wall and fastened to said hand-operated valve, whereby said hand air gun is assembled directly to said end wall of said cover.

5. The apparatus of claim 1 wherein said frame includes first and second end rings of wire rod and a plurality of elongated rods extending in an axial direction and connected between said end rings and spaced about the circumference of said frame to form a general drum shape; and a connecting conduit extending outwardly of the side wall of said frame and adapted to be connected to an input hose of a vacuum source equipped with an HEPA filter.

6. The apparatus of claim 1 wherein said means for mounting said cage and cover to said stand includes a flexible tension cord adapted to be wrapped around said cover to hold said cover against said frame and including a hook on each end adapted to be secured under tension to said stand.

7. The apparatus of claim 6 wherein said stand comprises a wheeled carriage; a generally upright standard mounted to said carriage; a laterally extending arm connected to said upright standard; means for adjusting the height of said arm along said standard; and a bracket mounted to the distal end of said adjustable arm remote form said standard and adapted to receive and hold said cage and said cover.

* * * * *